United States Patent [19]

Weder et al.

[11] Patent Number: 4,989,396

[45] Date of Patent: Feb. 5, 1991

[54] CURL WRAP AND METHODS FOR USING SAME

[75] Inventors: Donald E. Weder, Highland; William F. Straeter, Breese; Joseph G. Straeter, Highland, all of Ill.; Franklin J. Craig, Valley Park, Mo.; Wilma M. Donnelly, Highland, Ill.; Jack W. Redditt, Nashville, Tenn.

[73] Assignee: Highland Supply Corporation, Highland, Ill.

[21] Appl. No.: 393,992

[22] Filed: Aug. 15, 1989

Related U.S. Application Data

[63] Continuation-in-part of Ser. No. 249,761, Sep. 26, 1988, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, and a continuation-in-part of Ser. No. 232,541, Aug. 11, 1988, Pat. No. 4,835,834, which is a continuation of Ser. No. 876,405, Jun. 20, 1986, abandoned.

[51] Int. Cl.$^5$ ............... B65B 11/02; B65B 11/10; B65B 11/58; B65B 43/08
[52] U.S. Cl. ............... 53/397; 53/399; 53/456; 53/459; 53/462; 53/465; 493/459; 493/462
[58] Field of Search .......... 53/465, 461, 462, 397, 53/399, 592, 213, 219, 456, 459; 383/33; 47/28 R, 41.13; 493/459, 462; 206/423; 229/87.1

[56] References Cited

U.S. PATENT DOCUMENTS

| | | | |
|---|---|---|---|
| 411,739 | 9/1889 | Thayer | 206/423 X |
| 1,044,260 | 11/1912 | Schloss | 206/423 X |
| 1,446,563 | 2/1923 | Hughes | 206/423 X |
| 2,079,116 | 5/1937 | Gardner | 53/397 X |
| 2,586,078 | 2/1952 | O'Malley | 229/87.01 X |
| 2,766,553 | 10/1956 | Wedge | 206/423 X |
| 2,781,621 | 2/1957 | Wilson | 53/592 |
| 2,850,842 | 9/1958 | Eubank, Jr. | 53/461 X |
| 3,423,010 | 1/1969 | Corbett | 383/33 |
| 3,508,372 | 4/1970 | Wallerstein et al. | 53/399 |
| 3,660,958 | 5/1972 | Garrison | 53/399 |
| 4,741,720 | 5/1988 | Vargo | 53/213 X |

*Primary Examiner*—Horace M. Culver
*Attorney, Agent, or Firm*—Dunlap, Codding, Peterson & Lee

[57] ABSTRACT

A wrapping for wrapping items such as floral arrangements comprising a material having a first end, a second end and a preset curl in the material whereby the material rolls over itself in an unrestrained condition. A method of wrapping an item whereby at least one item is disposed on the material while the material is in a restrained condition and releasing at least one end of the material so that an end of the material rolls over the item thereby wrapping the item.

46 Claims, 4 Drawing Sheets

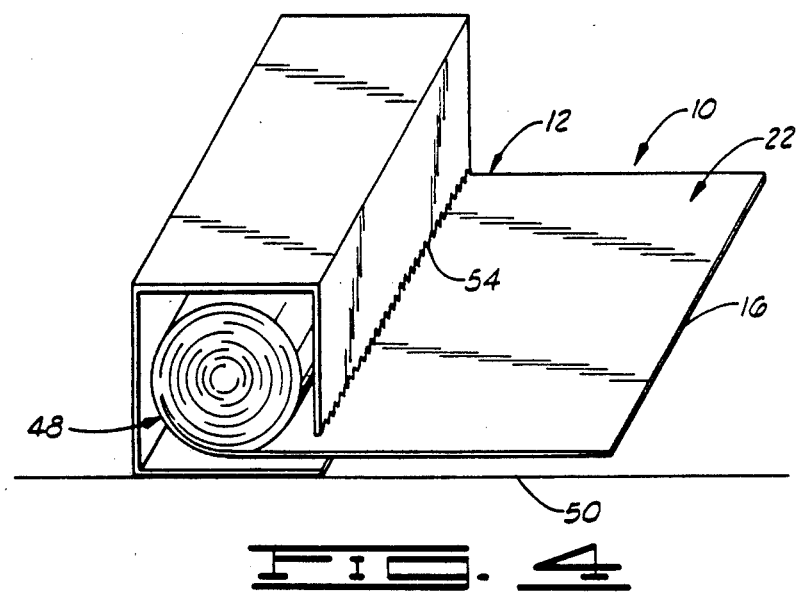
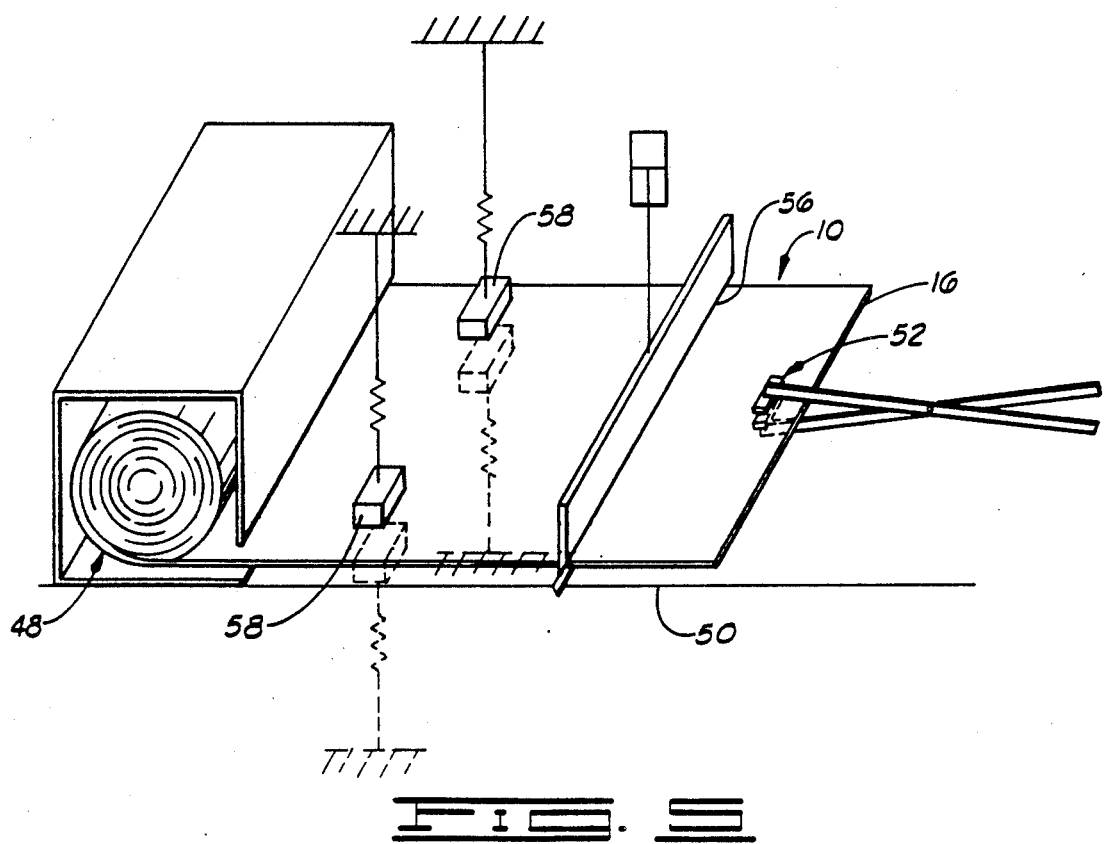

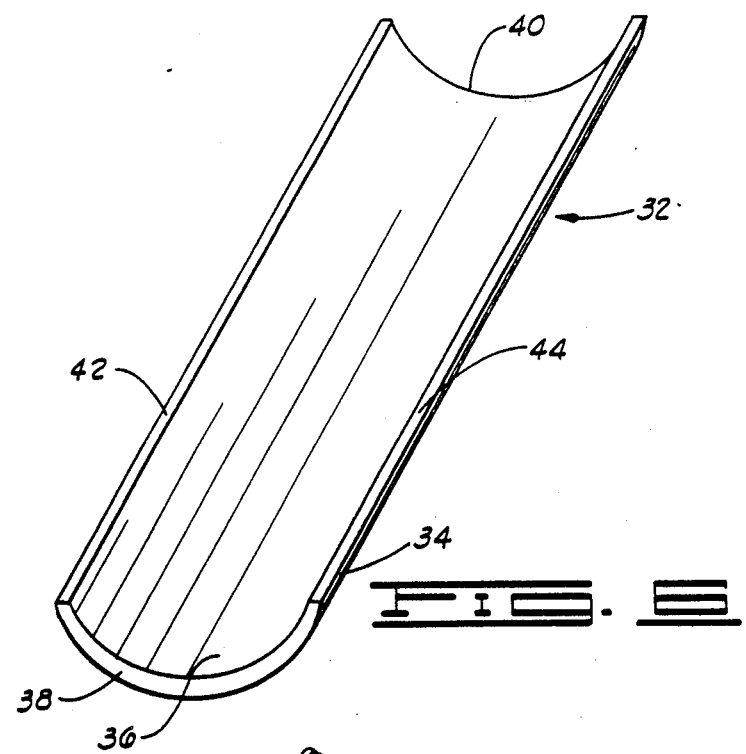
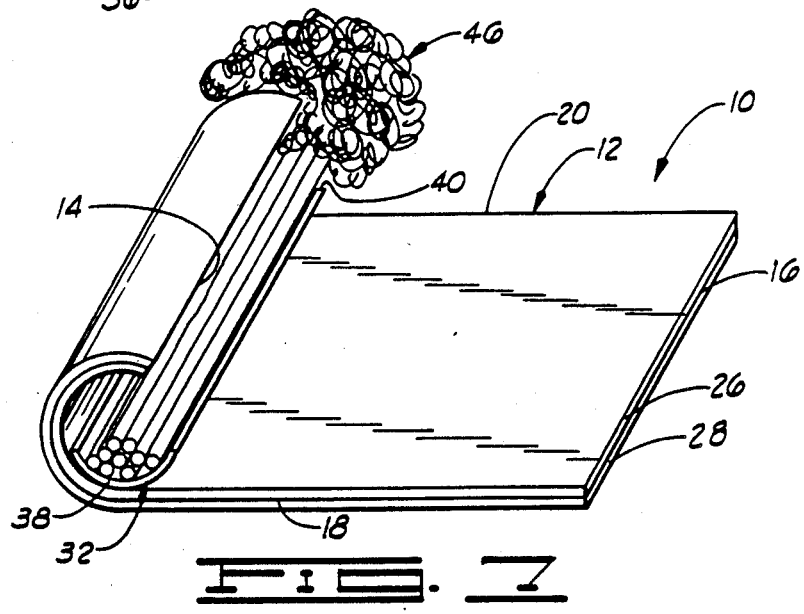
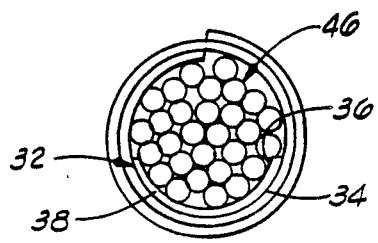

CURL WRAP AND METHODS FOR USING SAME

CROSS REFERENCE TO RELATED APPLICATIONS

This application is a continuation-in-part of U. S. Ser. No. 249,761, pending, filed Sept. 26, 1988, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL which is a continuation-in-part of Ser. No. 219,083, filed July 13, 1988, now U.S Pat. No. 4,897,031) entitled ARTICLE FORMING SYSTEM which is a continuation of U.S. Ser. No. 004,275, filed Jan. 5, 1987, entitled ARTICLE FORMING SYSTEM, now U.S. Pat. No. 4,773,182 which is a continuation of U.S. Ser. No. 613,080, filed May 22, 1984, entitled ARTICLE FORMING SYSTEM, now abandoned, and a continuation-in-part of co-pending application entitled FLOWER POT ACCESSORY filed about Aug. 11, 1988, U.S. Ser. No. 232,541 which is a continuation of U.S. Ser. No. 876,405, filed June 20, 1986, entitled FLOWER POT ACCESSORY, now abandoned.

Application U.S. Ser. Nos. 219,083 (now U.S. Pat. No. 4,837,031), 004,275 (now U.S. Pat. No. 4,773,182), and 232,541 (now U.S. Pat. No. 4,835,834), described above, are hereby incorporated by reference.

FIELD OF THE INVENTION

The present invention relates generally to wrapping materials for items and methods of using same.

SUMMARY OF THE INVENTION

A wrapping for wrapping items comprising a material having a first end and a second end, an upper surface and a lower surface, and a curl preset in the material. The curl is preset in the material so that the first end of the material, in an unrestrained condition, rolls over itself forming a roll of the material. At least a portion of the item to be wrapped is disposable generally on the material in at least a partially restrained condition of the material. The first end of the material rolls c over at least a portion of the item at least once for covering a portion of the item when the material is not restrained.

The present invention also comprises a method of wrapping an item comprising the following steps: providing a material as described above; restraining the material to prevent the material from rolling over itself; disposing an item near the first end of the upper surface of the material; and releasing the first end of the material whereby the first end rolls over at least a portion of the item and itself forming a roll containing the item. Another method for wrapping an item is to dispose the item in the roll of material after the roll is formed.

The present invention also comprises a wrapping for wrapping a first item and a second item, comprising a material having a first end, a second end and a middle section therebetween; an upper surface and a lower surface; and having a curl preset in the material. The curl is preset in the material so that the first end of the material in an unrestrained condition rolls over itself towards the middle section of the material, and the second end of the material rolls over itself towards the middle section of the material thereby forming two rolls of the material. At least portions of the first item and the second item are disposable generally on the material in at least a partially restrained condition of the material. The first end of the material rolls over the first item at least once for covering at least a portion of the first item, and the second end of the material rolls over the second item at least once for covering at least a portion of the second item when the material is not restrained. The first end of the material is severable from the second end of the material generally in the middle section of the material. Another method for wrapping a first item and a second item is to dispose the respective items in the rolls of the material after the rolls are formed.

The present invention further comprises a cradle for supporting an item. The cradle comprises a lower surface capable of positioning on a material as previously described, and an upper surface sufficiently sized to support the item. The cradle is capable of moving across a surface of the material as the material rolls over the item supported by the cradle and itself forming a roll of material such that the cradle and the item supported thereon do not rotate within the roll of material.

The present invention further comprises a method for wrapping an item, comprising providing a supply of a continuous sheet of a plurality of materials, each material being severable from the sheet of materials and having a first end, a second end and a curl preset in the material as previously described. At least a portion of the item is disposable generally on the material in at least a partially restrained condition of the material and the first end of the material rolls over the item at least once for covering a portion of the item when the material is unrestrained. The material, sufficiently sized to wrap an item, is isolated from the supply of materials by pulling the second end of the material from the supply over a work area until the entire material sufficiently sized to wrap an item is disposed over the work area and then restrained. The item is disposed near the first end of the material which is released from the supply of materials by severing the first end of the material from the supply of materials. The first end of the material rolls over the item and itself at least once forming a roll of material containing the item. The second end of the material is released.

BRIEF DESCRIPTION OF THE DRAWINGS

FIG. 4 shows a partial perspective view of a plurality of wrappings in the form of a continuous sheet of materials in a container having a cutting edge.

FIG. 5 shows a partial perspective view of a plurality of wrappings in the form of a continuous sheet of materials in a container from which the material is mechanically pulled over a work area to be cut by a cutting edge.

FIG. 6 shows a partial perspective view of a cradle constructed in accordance with the present invention.

FIG. 7 shows a partial perspective view of the cradle shown in FIG. 6 supporting a floral arrangement being wrapped by a wrapping constructed in accordance with the present invention.

FIG. 8 is an elevational side view of the wrapping shown in FIG. 7 with the wrapping completely about the floral arrangement which is supported in the cradle

DESCRIPTION OF THE PREFERRED EMBODIMENTS

Figure 1:
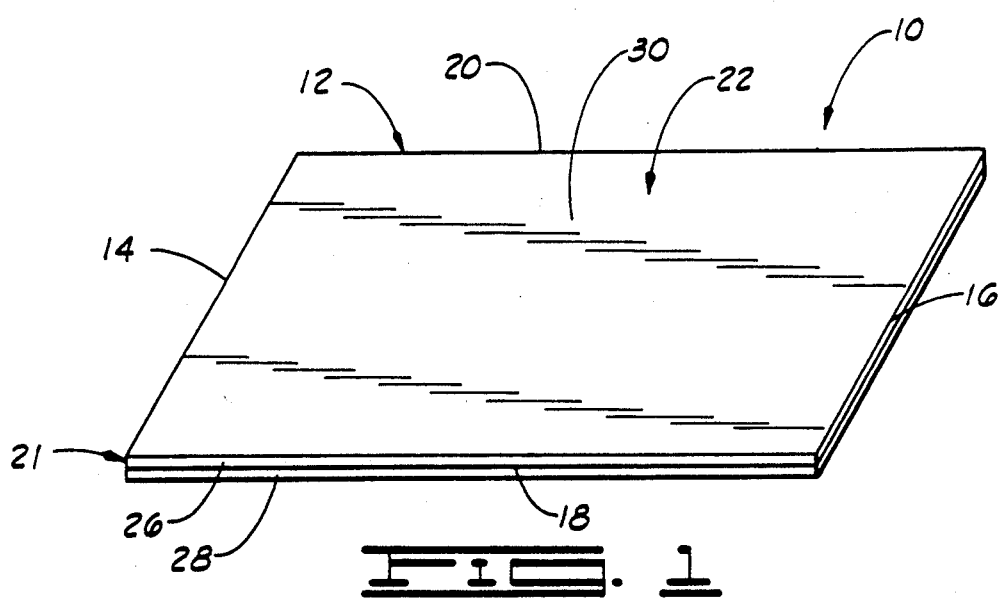
FIG. 1 shows a partial perspective view of the wrapping constructed in accordance with the present invention.
Figure 2:
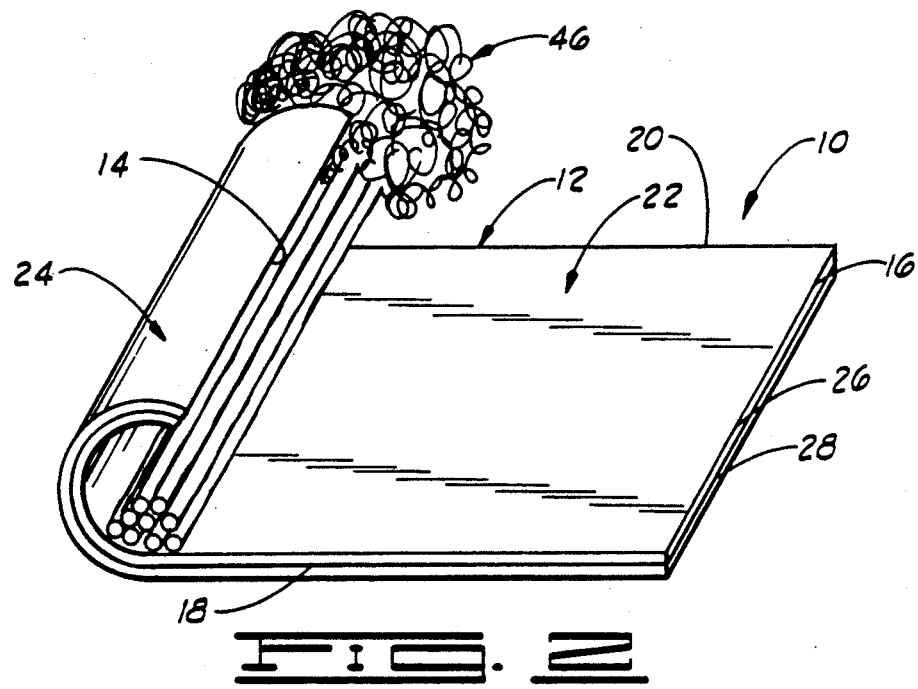
FIG. 2 shows a partial perspective view of the wrapping of FIG. 1 wrapping a floral arrangement.
Figure 3:
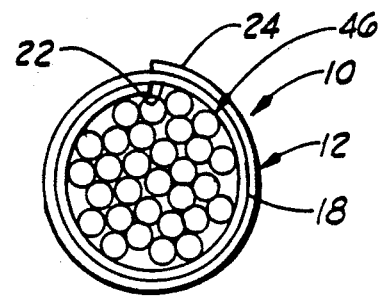
FIG. 3 shows an elevational side view of the wrapping shown in FIG. 2 with the wrapping about the floral arrangement.

Referring to FIG. 1, shown therein and designated generally by the reference numeral 10 is a wrapping which is at least a portion of an item. The wrapping 10 may be utilized to wrap any item in accordance with the present invention. Preferably, the item is a floral arrangement as generally designated by the numeral 46, one such arrangement being shown in FIGS. 2, 3, 7 and 8.

Referring to a preferred embodiment shown in FIG. 1, the wrapping comprises a material 12 having a first end 14, a second end 16, a third end 18, and a fourth end 20 forming a rectangular periphery 21. The material 12 further comprises an upper surface 22 and a lower surface 24. The material 12 is sufficiently sized and shaped to wrap at least a portion of an item as described herein. In a preferred embodiment shown in FIG. 1, the material 12 comprises a flat sheet, and more preferably a flat sheet comprising a first layer 26 and a second layer 28 having a middle section 30 at about the middle of the material 12 between the first end 14 and the second end 16 of the material. Although any shape of the material may be utilized in accordance with the present invention, preferred shaped include rectangles, squares and parallelograms. Trapezoidal shapes are also preferable since some items, such as floral arrangements, may require more wrapping material about one end than the other. The blooms of the flowers, for example, may require more wrapping material than the stems.

The material 12 is constructed from any suitable material that is capable of being wrapped about an item and retained a preset curl as described hereafter. Preferably the material 12 comprises cloth, paper (untreated or treated in any manner), cellophane, foil, man-made organic polymer film or combination thereof.

In one preferred embodiment, the material 12 is constructed from a relatively thin film of a substantially non-shape sustaining man-made organic polymer film. The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

A decorative pattern, such as a color and/or an embossed pattern, and/or other decorative surface ornamentation may be applied to the upper surface 22 and/or the lower surface 24 of the material 12 or portions thereof, including, but not limited to printed designs, coatings, colors, flocking or metallic finishes. The material 12 also may be totally or partially clear or tinted transparent material.

The material 12 may be constructed of a single layer of material, partially overlapping layers of material, or completely overlapping layers of the same or different types of materials. Any thickness of the material 12 may be utilized in accordance with the present invention as long as the material 12 is wrappable about an item and can retain the curl preset therein as described herein. Additionally, an insulating material such as bubble film, preferably as one of two layers, can be utilized in order to provide needed protection for the item wrapped therein. In a preferred embodiment, the material 12 is constructed from two polypropylene films (a 20"=15" sheet of Mobil 270 ABW white opaque film laminated to a 20"=15" sheet of Mobile 220 AB clear film) having a thickness in a range of from less than about 1.0 mil to about 2.5 mils.

A curl is preset in the material 12 such that the first end 14 and the second end 16 of the material 12, in an unrestrained condition, roll over themselves forming at least one roll of the material 12. The curl is preset by an appropriate method. In a preferred embodiment, the curl is preset by stretching the material; preferably the first layer 26 of a material 12 is stretched and laminated to another layer. The stretching of the material 12 or the first layer 26 creates a tension therein which manifests in a curl which permits the material to roll over itself so that the upper surface 22 of the material 12 or the first layer 26 becomes the inside layer of the roll of material.

Figure 9:
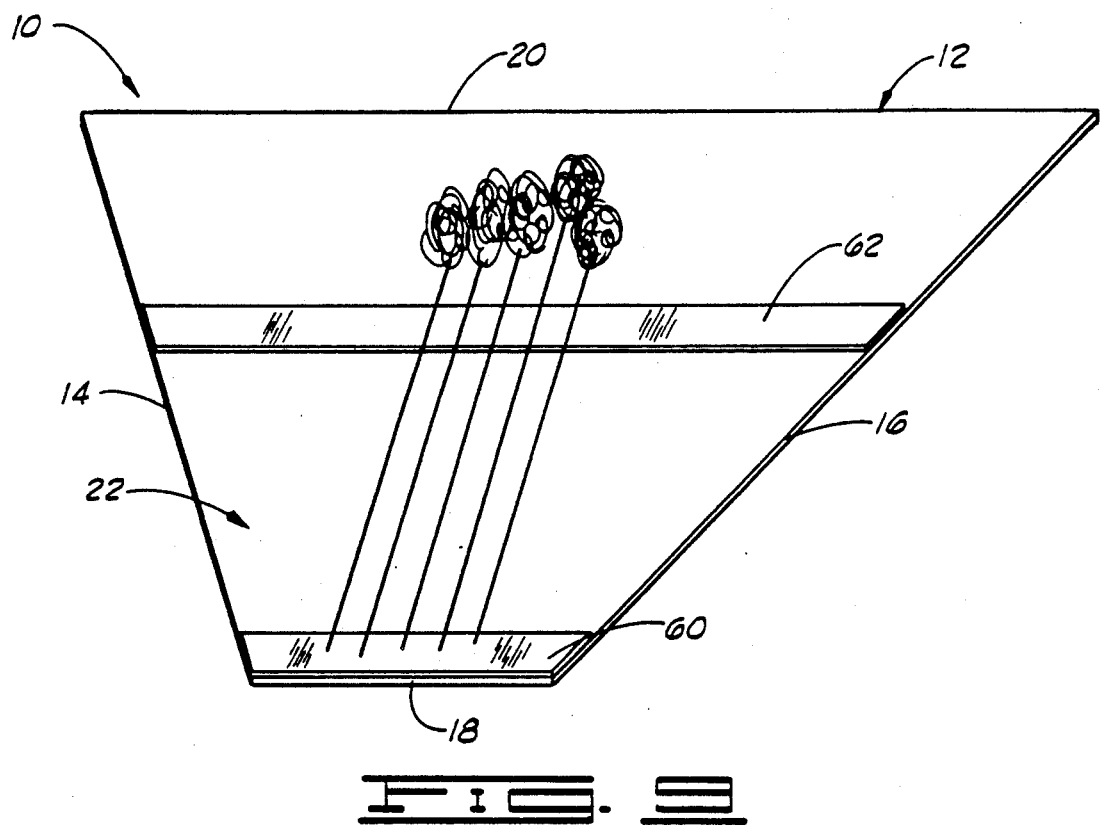
FIG. 9 shows an embodiment of the invention wherein different portions of the wrapping are provided with different amounts of curl.

The first layer 26 of the material 12 may be the same or a different size as the other layer to which it is secured and may comprise one or more sections. In a preferred embodiment comprising a first and second layer, the first layer having a preset curl formed therein comprises at least one section sized smaller than the second layer. This section may be selectively positioned on the second layer such that a non-uniform or uniform curl is preset in the material. For example, a section eccentrically positioned on the material 12 may produce a curl in the material 12 which is tighter at one area than another area. Also, sections having different degrees of curl present therein may be positioned on the material to produce a non-uniform or uniform curl. Referring to the embodiment shown in FIG. 9, section 60 has a tighter curl than section 62 and is positioned on the material 12 such that the material 12 wrapping the stem portion 64 of the floral arrangement 46 curls more tightly about the floral arrangement 46 than the portion of the material 12 wrapping the bloom portion 66 of this floral arrangement 46. The tighter curl serves to secure the wrapping 10 about the floral arrangement 46. In this embodiment, the section 60 and 62 are strips of material across the entire width of the material 12 (from the first end 14 to the second end 16). However, the sections may be of any size or shape that produces the desired curling effect. In another embodiment the layer with the preset curl is sized larger than the layer without the preset curl.

In another embodiment, a material 12 is contacted with a surface such as an edge or a roller capable for producing a curl in the material which is at least the length of the longest of the first end 14 or the second end 16 of the material 12. The surface preferably contacts either the first end 14 or the second end 16 of the material 12, and, with sufficient pressure to preset a curl in the material, contacts the upper surface 22 of the material from one end to the opposite end thereof. Preferably the material 12 is rolled, with pressure, over the surface until the entire upper surface 22 of the material 12 has been contacted by the surface.

Any other appropriate method may be utilized in accordance with the present invention to preset the curl in the material. For example, laminating a dry paper web to a man-made organic film or foil and then exposing the laminated material to an environment more humid than that in which the paper was stored and laminated can produce a preset curl in the material which will curl toward the film or foil; laminating a very wet or moist paper web to a man-made organic film or foil and then exposing it to a dryer atmosphere to produce a preset curl in the material which will toward the paper; laminating a foil or paper to another material with a curl already set into the foil or paper by drawing it over a surface at an angle as described herein or setting the curl into the foil or paper during the lamination process; heat treating foil including differential heat treating processes; and heat treating man-made organic film during the stretching process.

The characteristics of the curl are determined by a number of variable factors: the type of material utilized; the amount of pressure applied to the material 12 or the extent of the stretching of the first layer 26; the size of the material 12; and the thickness of the material 12. The extent of the pressure applied to the material or the amount of stretching of a layer may need to be varied due to the material utilized in order to preset a curl sufficiently to be utilized in accordance with the present invention.

According to the present invention, the curl preset in the material 12 permits the material 12 to roll over itself from either the first end 14 of the material 12, if the second end 16 of the material 12 is restrained, or the second end 16 of the material 12 to roll over if the first end 14 is restrained, or both ends 14 and 16 to roll over towards each other if both ends are unrestrained. The ends 14 and 16 preferably roll over towards the upper surface 22 of the material 12. In one embodiment the material 12 is sized such that the material rolls over itself again and again forming a tube.

An item is disposed on or near the upper surface 22 of the material 12 with the material in at least a partially restrained condition to prevent the rolling over of the material. In a preferred embodiment, the material 12 is positioned horizontal to the floor on a work area and the item is disposed on the upper surface 22 of the material 12 near whichever end of the material 12 will be released to roll over itself. In another embodiment, two items are respectively disposed near each end 14 and 16 of the material 12 so that when each end 14 and 16 is released, each end 14 and 16 rolls over each item; the middle section 30 of the material 12 may be restrained in order to control the material 12 as it rolls and then the middle section 30 severed to produce two rolls, each containing an item.

The item may also be disposed near the material 12 but not directly on the material 12. In one embodiment, the material 12 is about vertical or at an angle to the floor and at least a portion of the item disposed near one end of the material 12. At least one end of the material 12 is released from restraint so that the material rolls over itself and at least a portion of the item. This embodiment can be an especially effective wrapping for delicate items such as floral arrangements wherein the floral arrangement might be damaged by the rolling process.

Another method in accordance with the present invention permits the material 12 as described herein to roll over itself and the item to be disposed in the roll of material 12 after the roll has been formed.

Another embodiment utilizes a cradle 32 shown in FIG. 6-8 comprising a lower surface 34 positionable on the material 12 and an upper surface 36 sufficiently sized to support the item disposed thereon. Referring to one embodiment shown in FIG. 6, the cradle 32 further comprises a first end 38, a second end 40, a first side 42, and a second side 44. The surface 36 preferably is curved in order to retain an item therein. The cradle 32 may be constructed from any suitable material which would permit the cradle 32 to move across the surface 36 of the material 12 as the material 12 rolls over the item and itself forming a roll of material such that the cradle 32 and the item supported therein do not rotate within the roll of material.

The item is disposed on the upper surface 36 of the cradle 32, and the lower surface 34 of the cradle 32 is placed on the upper surface 22 of the material 12 near the ned of the material 12 which will roll over the item and the cradle. Two cradles 32 and items disposed therein may be placed near each end of the material 12 to form two rolls containing items supported by cradles 32 as described herein.

Any appropriate item may be wrapped in accordance with the present invention. Preferably, the item is a floral arrangement, one such arrangement being schematically shown in FIGS. 2 and 7 and generally designated by the numeral 46. "Floral arrangement" as used herein means cut fresh flowers, artificial flowers, other fresh and/or artificial plants or other floral materials and may include other secondary plants and/or ornamentation which add to the aesthetics of the overall floral arrangement.

Figure 10:
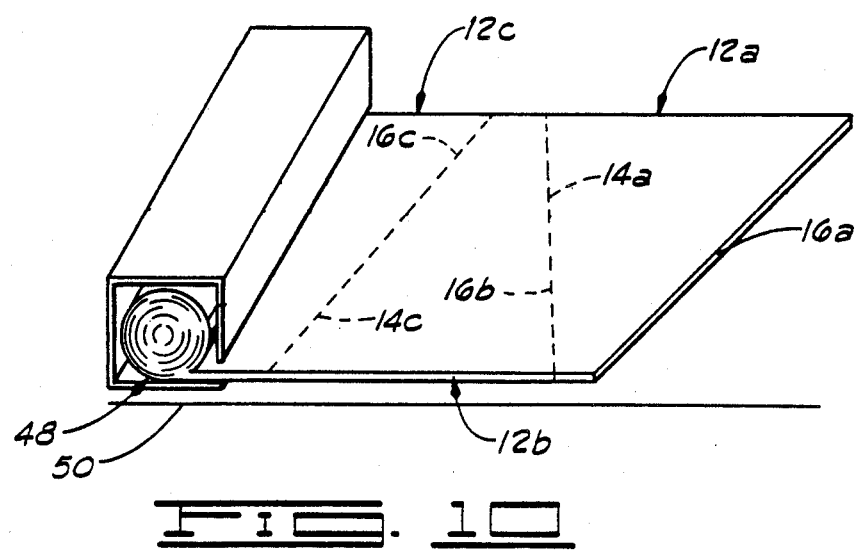
FIG. 10 shows a method of dispensing wrappers.

As shown in FIGS. 4, 5 and 10, the material 12 may be stored in a supply of materials 48 such as a roll of a continuous sheet of materials 12, each material 12 being severable from the supply of materials 48. As shown in FIG. 10, the material 12a, 12b, 12c may be severed by perforating the ends 14a, 14b, 14c and 16a, 16b, 16c of each material and then applying pressure to the perforation, or by cutting each first end 14 of each material 12 as described herein. The material 12 is isolated from the supply of materials 48 by pulling the second end 16 of the material 12 from the supply materials 48 over a work area 50 until the entire material 12, sufficiently sized to wrap an item, is disposed over at least a portion of the work area 50. The work area 50 is an area way from the supply of materials 48; preferably the work area 50 is a surface adjacent to the supply of materials 48. The material 12 is restrained to prevent the material from rolling over itself. The first end 14 of the material 12 remains restrained while attached to the supply of materials 48; the second end 16 of the material 12 is manually restrained as in FIG. 4 or mechanically restrained by a gripping element 52 as in FIG. 5. In FIG. 4 the second end 16 of the material 12 is manually pulled from the supply of materials 48 and restrained, the first end 14 (not shown in FIG. 4) of the material 12 (which is any position on the continuous sheet which, when severed, produces as sufficiently sized material 12) is contacted with a cutting edge, here a serrated edge, thereby cutting the first end 14 of the material 12 and severing the material 12 from the supply of materials 48. The first end 14 of the material 12 and the second end 16 of the material 12 are then restrained. At least a portion of an item is placed on the upper surface 22 of the material 12 near the first end 14 thereof. The first end 14 is released and the first end 14 rolls over the item and itself at least once to form a roll of material containing the portion of the item previously placed on the material 12.

As shown in FIG. 5, the second end 16 of the material 12 is gripped by a gripping element 52 comprising a means for gripping and pulling the material 12 over a work area 50. Once sufficient material 12 is disposed over the work area 50 a cutting edge 56 contacts the first end 14 of the material 12 (which is any position on the continuous sheet which, when severed from the supply of materials 48, produces a sufficiently sized material 12) thereby severing the material 12 from the supply of materials 48. Restraining elements 58 contactingly engage a portion of the supply of materials 48 over the work area 50 to maintain the position of the next material from the supply of materials 48 to be gripped by the gripping element 52.

It may be appreciated from the foregoing that the present invention provides method to expedite the wrapping of an item, especially a plurality of items. As soon as the item or items are disposed on or near the material 12, the material 12 may be released whereby the material 12 rolls over the item and the item is automatically wrapped as described herein.

Once the item is in the wrapping 10, the wrapping 10 may require additional securing to remain about the item. Preferably a securing agent is utilized to secure the wrapping about the item. Some examples of securing agents are labels, adhesives (including pressure sensitive adhesive materials), bands, ribbons, strings, tape, staples or combinations thereof. Some of the agents would secure the end of the material on the outside of the roll to the remainder of the wrapper, while other securing agents may bind about the circumference of the wrapping. Another way to secure the wrapping is to heat seal a portion of the wrapping 10, preferably the end of the material 12 on the outside of the roll, to another portion of the wrapping 10. One way to do this is to contact the wrapping 10 with an iron of sufficient heat to heat seal the wrapping 10.

Changes may be made in the embodiments of the invention described herein or in parts or elements of the embodiments described herein or in the steps or int the sequence of steps of the methods described herein without departing from the spirit and scope of the invention as defined in the following claims.

What is claimed is:

1. A method of wrapping an item, comprising:
providing a material having a first end and a second end, an upper surface and a lower surface, and having a curl present in the material whereby the first end of the material in an unrestrained condition rolls over itself forming a roll of the material, at least a portion of the item being disposable generally on the material in at least a partially restrained condition of the material and the first end of the material rolling over at least a portion of the item at least once for covering a portion of the item when the material is unrestrained;
restraining the material to prevent the material from rolling over itself;
disposing an item near the first end of the upper surface of the material; and
releasing the first end of the material whereby the first end rolls over at least a portion of the item and itself forming a roll containing the item.

2. The method of claim 1 wherein at least one end of the material is manually restrained.

3. The method of claim 1 wherein at least one end of the material is restrained by a releasable gripping element.

4. The method of claim 1 wherein the material is provided from a supply of the materials in the form of a continuous sheet of materials and further comprising severing a portion of the sheet of materials sufficiently sized to cover at least a portion of the item from the supply of material.

5. The method of claim 4 wherein severing a portion of the sheet of material comprises contacting the sheet of materials with a cutting edge thereby cutting the sheet of materials 6. The method of claim 1 wherein the item is disposed on the upper surface of the material near the first end of the material.

7. The method of claim 1 wherein the item is disposed near the first end of the upper surface of the material by supporting the item a distance from the upper surface of the material.

8. The method of claim 1 wherein the item is supported a distance from the upper surface of the material by supporting the item on a cradle having a lower surface disposed on the upper surface of the material, and an upper surface sized sufficiently to support the item thereon, and being capable of moving across the upper surface of the material as the material rolls over the item and the upper surface of the material forming a roll of the material including the item and the cradle such that the cradle ad the item supported by the cradle does not rotate as the material rolls over itself.

9. The method of claim 1 wherein the item is a floral arrangement.

10. The method of claim 1 wherein the material is selected from a group consisting of foil, paper, cellophane, man-made organic film or combination thereof.

11. The method of claim 1 further comprising securing the wrapping about the item with a securing agent by positioning the securing agent about at least a portion of the wrapping wherein the securing agent is selected from a group consisting of a label, an adhesive, a band, a ribbon, a string, a tape, a staple or combinations thereof.

12. The method of claim 1 further comprising securing the wrapping about the item by heat sealing at least a portion of the wrapping to another portion of the wrapping whereby the wrapping is secured about the item.

13. A method of wrapping a first item and a second item, comprising:
providing a material having a first end, a second end; an upper surface, a lower surface an a middle section therebetween; and having a curl preset in the material, whereby the first end of the material in an unrestrained condition rolls over itself towards the middle section of the material and the second end of the material rolls over itself towards the middle section of the material thereby forming two rolls of the material;

disposing the first item near the first end of the upper surface of the material and the second item near the second end of the upper surface of the material while the material is at least partially restrained;

releasing the first end of the material and the second end of the material so that the ends of the material roll over the items and the material at least once towards the middle section of the material forming two rolls of the material, each roll containing an item; and severing the material generally in the middle section of the materials between the rolls of material.

14. The method of claim 13 wherein at least one end of the material is manually restrained.

15. The method of claim 13 wherein at least one end of the material is restrained by a releasable gripping element.

16. The method of claim 13 wherein the material provided from a supply of materials in the form of a continuous sheet of materials and further comprises severing a portion of the sheet of materials sufficiently sized to cover at least a portion of the item from the supply of materials.

17. The method of claim 13 wherein severing a portion of the sheet of materials comprises contacting the sheet of materials with a cutting edge thereby cutting the sheet of materials.

18. The method of claim 13 wherein the items are disposed on the upper surface of the material.

19. The method of claim 13 wherein the items are disposed near the first end of the upper surface of the material by supporting the items a distance from the upper surface of the material.

20. The method of claim 19 wherein each item is supported a distance from the upper surface of the material by supporting each item on a cradle having a lower surface disposed on the upper surface of the material, and an upper surface sized sufficiently to support an item thereon, and being capable of moving across the upper surface of the material as each end of the material rolls over the items and itself forming two rolls of the material, each roll including the cradle and the item such that the cradle and the item supported thereon does not rotate in the roll of material.

21. The method of claim 13 wherein further comprising securing the wrapping about each item with a securing agent by positioning the securing agent about at least a portion of the wrapping wherein the securing agent is selected form a group consisting of a label, an adhesive, a band, a ribbon, a string, a tape, a staple or combinations thereof.

22. The method of claim 13 further comprising securing the wrapping about the item by heat sealing at least a portion of the wrapping to another portion of the wrapping whereby the wrapping is secured about the item.

23. A method of wrapping an item, comprising:
providing a material in a restrained position having a first end and a second end, and having a curl preset in the material whereby the first end of the material and the second end of the material in an unrestrained condition rolls over itself forming at least one roll of the material;

releasing the first end of the material and restraining the second end of the material whereby the first end rolls over itself forming a roll of material; and disposing at least a portion of the item in the roll of material.

24. The method of claim 23 wherein the material is provided from a supply of the materials in the form of a continuous sheet of materials and further comprising severing the material from the sheet of materials and restraining at least the second end of the material.

25. The method of claim 23 wherein the item is a floral arrangement.

26. The method of claim 23 wherein the material is selected from a group consisting of foil, paper, cellophane, man-made organic film or combinations thereof.

27. The method of claim 23 further comprising securing the roll of material including the item disposed therein with a securing agent by disposing the securing agent about a portion of the wrapping, wherein the securing agent is selected from the group consisting of a label, an adhesive, a band, a ribbon, a string, tape or combinations thereof.

28. The method of claim 23 wherein the second end of the material is manually restrained.

29. The method of claim 23 wherein the second end of the material is restrained by a releasable gripping element.

30. The method of claim 23 further comprising securing the wrapping about the item with a securing agent by positioning the securing agent about at least a portion of the wrapping, wherein the securing agent is selected from a group consisting of a label, an adhesive, a band, a ribbon, a string, a tape, a staple or combinations thereof.

31. The method of claim 23 further comprising securing the wrapping about the item by heat sealing at least a portion of the wrapping to another portion of the wrapping whereby the wrapping is secured about the item.

32. A method of wrapping a first item and a second item, comprising:
providing a material in a restrained condition having a first end, a second end and a middle section therebetween, and having a curl preset in the material whereby the first end of the material and the second end of the material in a n unrestrained condition rolls over itself forming at least one roll of the material;

releasing the first end of the material and the second end of the material whereby the first end rolls over itself forming a roll of material and the second end rolls over itself forming another roll of material;

disposing at least a portion of the first item in one roll of material and at least a portion of the second item in the other roll of material; and severing the rolls of material by severing the middle section of the material between the rolls of material.

33. The method of claim 32 wherein the material is provided from a supply of the materials in the form of a continuous sheet of materials and further comprising severing the material from the sheet of materials.

34. The method of claim 32 wherein the item is a floral arrangement.

35. The method of claim 32 wherein the material is selected from a group consisting of foil, paper, cellophane, man-made organic film or combinations thereof.

36. The method of claim 32 further comprising securing the wrappings about the items disposed therein with a securing agent by disposing the securing agent about a portion of the wrapping, wherein the securing agent is selected from the group consisting of a lable, an adhesive, a band, a ribbon, a string, tape or combinations thereof.

37. The method of claim 32 further comprising securing the wrappings about the items by heat sealing at least a portion of the wrappings about the items by heat sealing at least a portion of the wrapping to another portion of the wrapping whereby the wrappings are secured about the items.

38. The method of claim 32 wherein the severing of the middle section comprises contacting the middle section of the material with a cutting edge thereby cutting the material.

39. A method for wrapping an item, comprising:
providing a supply of materials in the form of a continuous sheet of a plurality of materials, each material being severable from the sheet of materials and each material having a first end, a second end and a curl preset in the material whereby the first end of the material in an unrestrained condition rolls over itself again and again forming a roll of the material, at least a portion of the item being disposable generally on the material in at least a partially restrained condition of the material and the first end of the material rolling over the item at least once for covering a portion of the item when the material is unrestrained;
isolating the material sufficiently sized to wrap an item from the supply of materials by pulling the second end of the material from the supply over a work area until the entire material sufficiently sized to wrap an item is disposed over the work area nd restraining the material;
disposing the item near the first end of the material;
releasing the first end of the material from the supply of materials by severing the first end of the material from the supply of materials whereby the first end of the material rolls over the item and itself at least once forming a roll of material containing the item; and releasing the second end of the material.

40. The method of claim 39 wherein the material is isolated by the supply of material by gripping the second end of the material with a releasable gripping element which grips the second end of the material and pulls the material from the supply of materials over the work area.

41. The method of claim 39 wherein the material is restrained by gripping the second end of the material with a gripping element and contacting an area near the sheet of material near the first end of the material with at least one releasing agent.

42. The method of claim 39 wherein the material is severed from the supply of material by contacting the first end of the material with a cutting edge.

43. The method of claim 39 wherein the cutting edge is pressed against the material positioned over the work area.

44. The method of claim 39 wherein the cutting edge is fixedly positioned above the work area wherein the first end of the material is moved from the work area to contact the cutting edge thereby cutting the first end of the material.

45. The method of claim 39 further comprising securing the wrapping about the item with a securing agent by positioning the securing agent about at least a portion of the wrapping, wherein the securing agent is selected from a group consisting of a label, an adhesive, a band, a ribbon, a string, a tape, a staple, or combinations thereof.

46. The method of claim 39 further comprising securing the wrapping about the item by heat sealing at last a portion of the wrapping to another portion of the wrapping whereby the wrapping is secured about the item.

* * * * *

UNITED STATES PATENT AND TRADEMARK OFFICE
CERTIFICATE OF CORRECTION

PATENT NO. : 4,989,396
DATED : February 5, 1991
INVENTOR(S) : Donald E. Weder It is certified that error appears in the above-identified patent and that said Letters Patent is hereby corrected as shown below:

Column 1, line 28, "U.S. Patent No. 4,837,031" should be --U.S. Patent No. 4,897,031--.

Column 1, line 46, after the word, rolls, the letter "c" should be omitted.

Column 3, line 15, after the word, is, insert the phrase --constructed in accordance with the present invention for wrapping--.

Column 3, line 35, the word "shaped" should be --shapes--.

Column 3, line 43, the word "retained" should be --retaining--.

UNITED STATES PATENT AND TRADEMARK OFFICE
CERTIFICATE OF CORRECTION

PATENT NO. : 4,989,396

DATED : February 5, 1991

INVENTOR(S) : Donald E. Weder

It is certified that error appears in the above-identified patent and that said Letters Patent is hereby corrected as shown below:

Column 4, line 25, the phrase "a 20"=15" " should be --a 20"x15"--.

Column 4, line 27, the phrase "a 20"=15" " should be --a 20"x15"--.

Column 5, line 26, before the word, toward, insert the word --curl--.

Column 6, line 33, the word "ned" should be --end--.

Column 7, line 56, the word "int" should be --in--.

Column 7, line 65, the word "present" should be --preset--.

UNITED STATES PATENT AND TRADEMARK OFFICE
CERTIFICATE OF CORRECTION

PATENT NO. : 4,989,396

DATED : February 5, 1991

INVENTOR(S) : Donald E. Weder

It is certified that error appears in the above-identified patent and that said Letters Patent is hereby corrected as shown below:

Column 8, line 43, the word "ad" should be --and--.

Column 8, line 49, the word "combination" should be --combinations--.

Column 9, line 50, delete the word "wherein".

Column 11, lines 9 and 10, after the word, wrappings, delete the phrase "about the items by heat sealing at least a portion of the wrappings".

Signed and Sealed this

Twentieth Day of October, 1992

Attest:

DOUGLAS B. COMER

Attesting Officer     Acting Commissioner of Patents and Trademarks